Feb. 24, 1942.  E. A. LAPORT  2,274,271
TRANSMITTING SYSTEM
Filed Nov. 16, 1940   9 Sheets-Sheet 1

INVENTOR
EDMUND A. LAPORT
BY
ATTORNEY

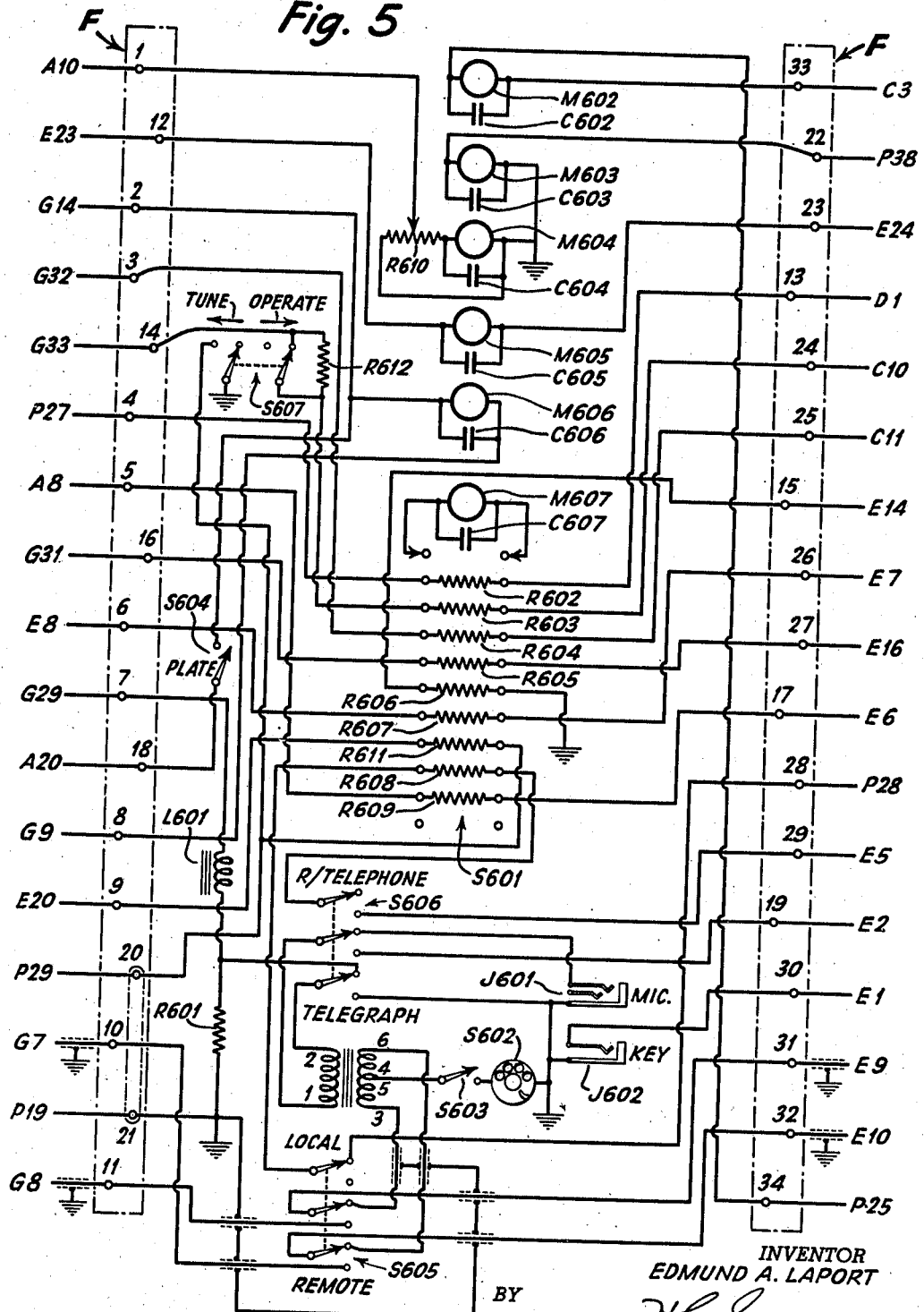

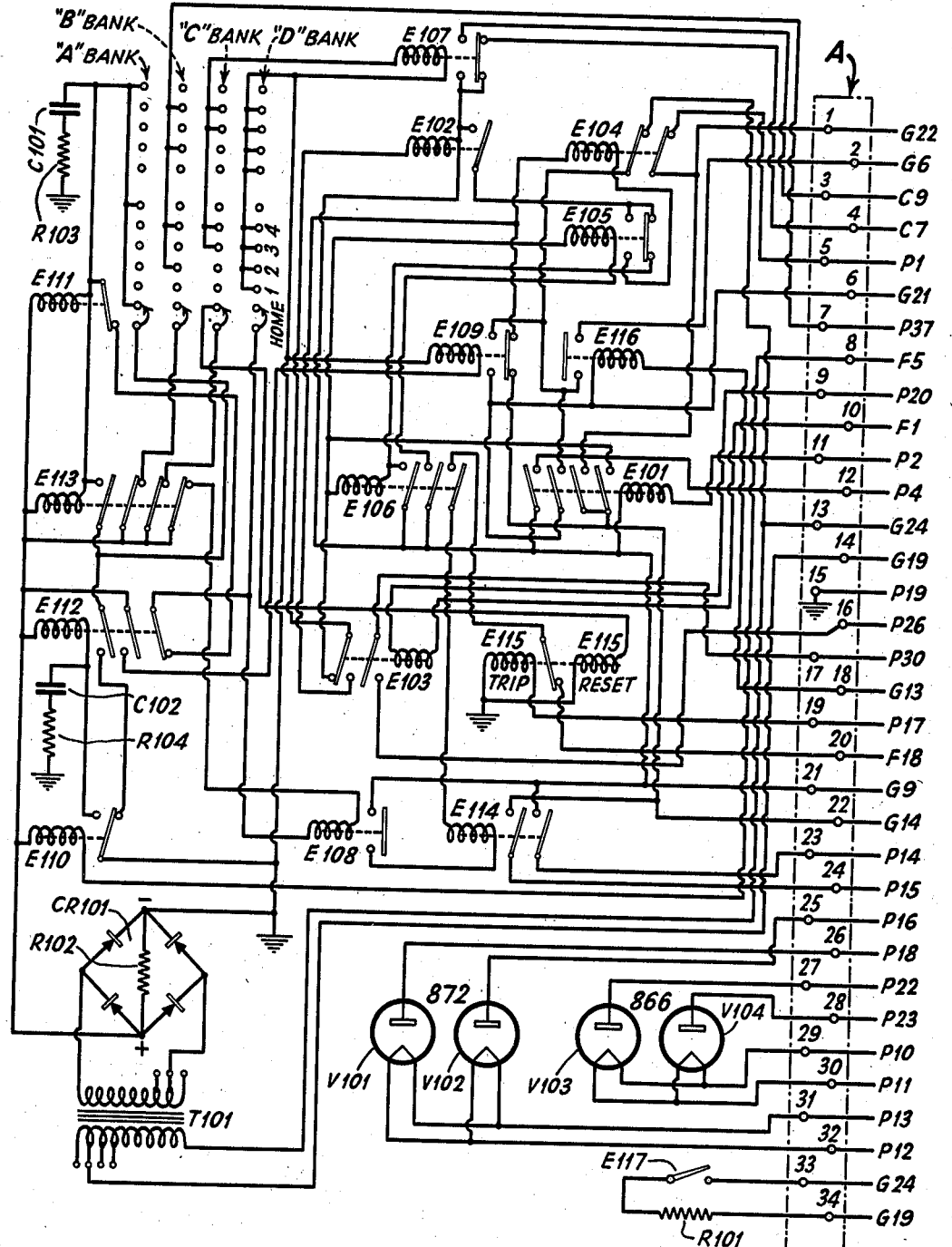

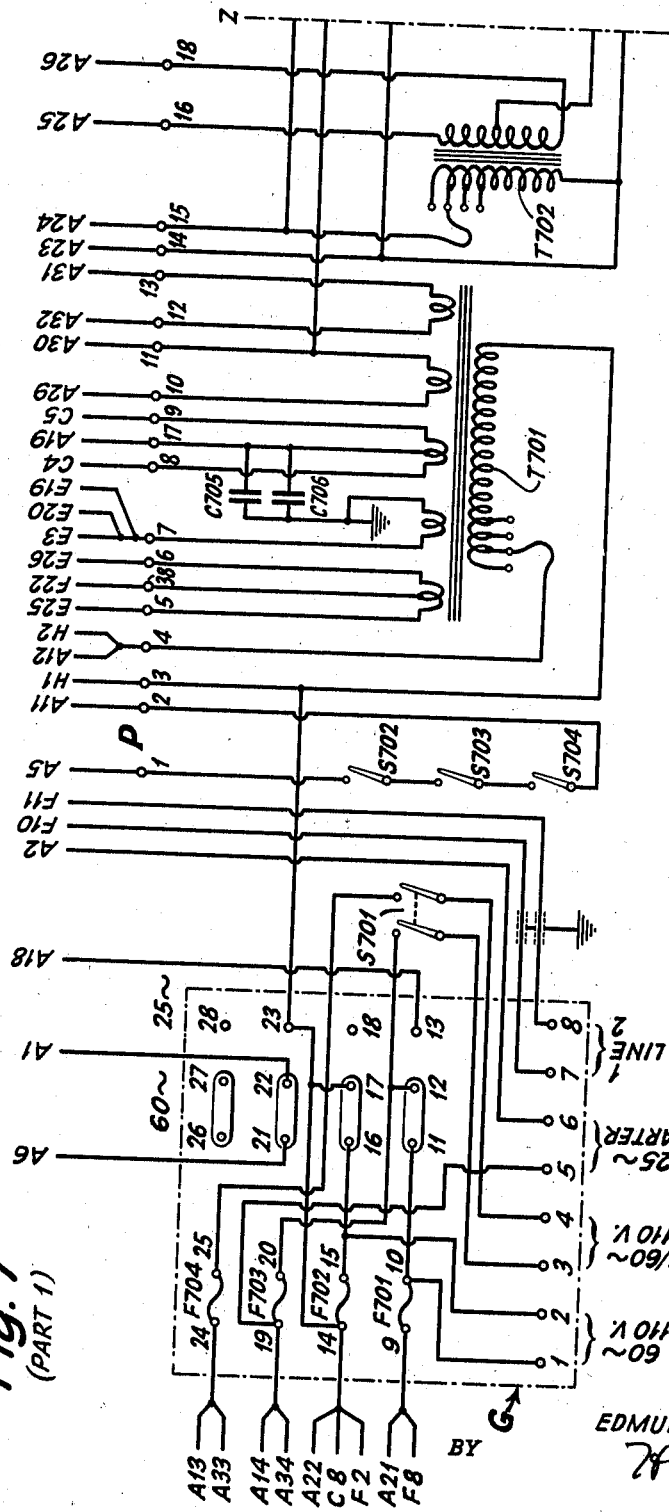
Fig. 7 (PART 1)

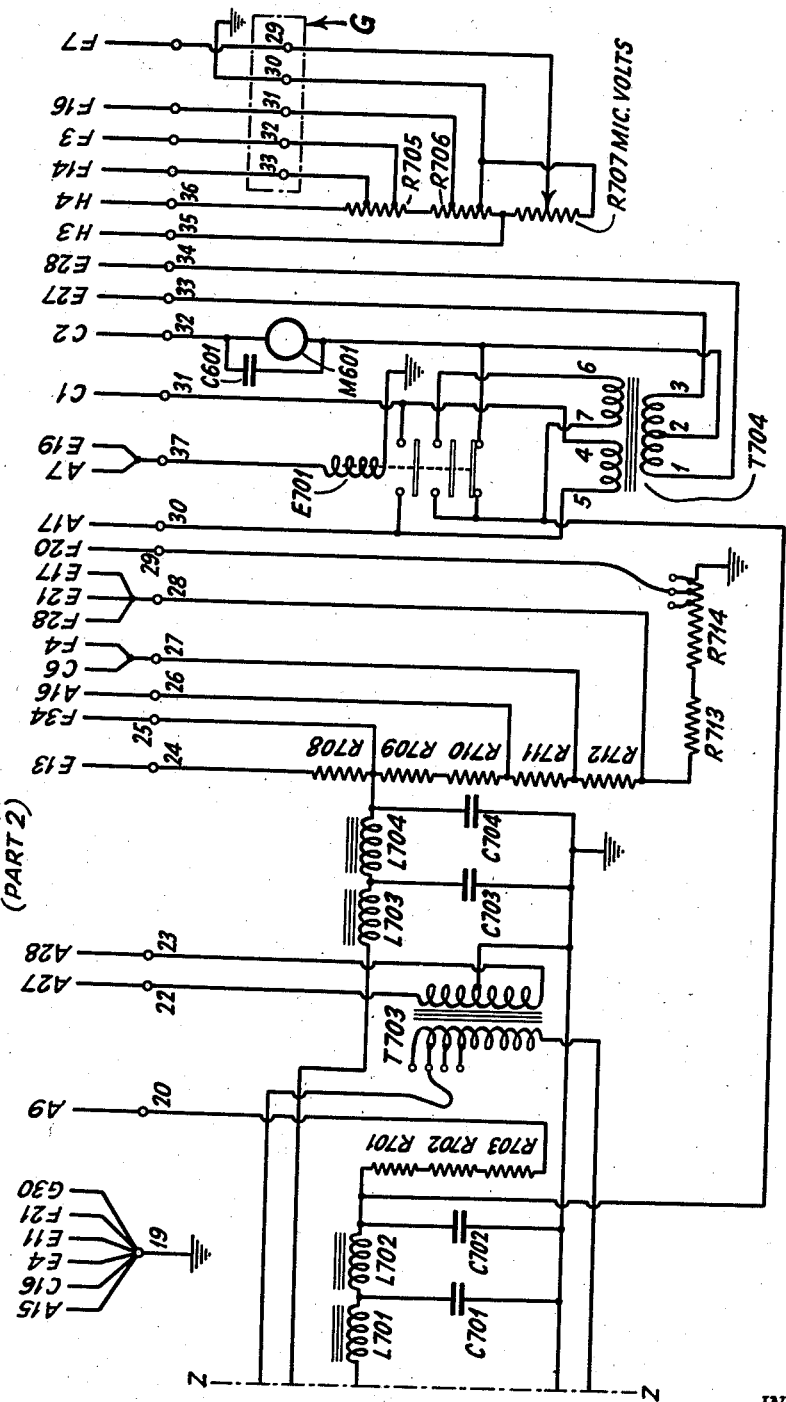

Feb. 24, 1942.  E. A. LAPORT  2,274,271
TRANSMITTING SYSTEM
Filed Nov. 16, 1940  9 Sheets-Sheet 9

INVENTOR
EDMUND A. LAPORT
BY H. S. Grover
ATTORNEY

Patented Feb. 24, 1942

2,274,271

UNITED STATES PATENT OFFICE 2,274,271

TRANSMITTING SYSTEM

Edmund A. Laport, Quebec, Quebec, Canada, assignor to Radio Corporation of America, a corporation of Delaware Application November 16, 1940, Serial No. 365,891

9 Claims. (Cl. 250—17)

My present invention relates to radio transmitters. One broad object of my invention is to provide an improved general purpose high-frequency communication transmitter. Further general objects of my invention are to provide a transmitter having a wide frequency range; to provide a high frequency transmitter having a multiplicity of independent channels; to provide a transmitter which may be selectively employed for different types of emission and to provide efficient switching means whereby the desired frequency of operation, channel and type of emission may be quickly chosen. Another more specific object is to provide an improved dialing system for carrying out the switching processes either locally at the transmitter, or at some remote point.

Other objects, advantages and features of my present invention will appear as the more detailed description thereof proceeds.

Briefly, the transmitting system about to be described in greater detail consists of two radio frequency channels. Each channel includes a master oscillator which may be switched to either crystal or auto-excitation. Common intermediate and final power amplifier tubes are provided for the oscillation generators. A separate radiating system, however, is provided for each channel.

For CW or keyed carrier signalling, the output of an audio oscillator is keyed in accordance with the signal to be transmitted. This keyed tone is rectified and employed to operate a keying relay which operates to block the oscillator and intermediate power stages of the transmitter.

For MCW signalling keyed, amplified tone waves are fed to modulating tube system to modulate the plate and screen electrodes of the power amplifier tubes of the transmitter.

For telephonic or voice signalling, voice currents are similarly employed as in the MCW case to plate and screen grid modulate the power amplifier tubes.

A dialing system is provided for quick changeover from one channel to another and also from one type of transmission or modulation to another. Thus in the transmitter to be described, operating a dial of the automatic telephone type to its first position which transmits one pulse, sets up the transmitting system so that one channel, for example channel A, is operatively connected into circuit for MCW or telephonic operation. The second position of the dial whereby two impulses are transmitted, maintains the transmitter on channel A but, however, sets it up for CW operation. The third and fourth positions of the dial serve to transmit respectively, three and four pulses and similarly, set up the transmitter for operation on, however, the B channel. It is to be noted that when changing from MCW to telephonic signalling, a manually operated switch is thrown which disconnects the local oscillator and connects a microphone into circuit. The foregoing dialing and switching operations may be carried out locally at the transmitter or, as will be explained more fully hereinafter, by means of apparatus situated at a point remote from the transmitter.

Means, which will be explained more fully later, are provided at both local and remote points for causing proper sequential energization of the tubes in the transmitter.

Turning to the accompanying drawings:

Figure 1 is a wiring diagram of an oscillation generator and antenna system forming part of one channel of my transmitting system.

Figure 2, similarly, is a wiring diagram of the oscillator and antenna of the other, or B channel, of my transmitting system.

Figures 5 and 6 are wiring diagrams of control circuits for my transmitting system.

Figure 7 is a further diagram of power supply circuits and modulating elements used in conjunction with my transmitter.

Figure 1:
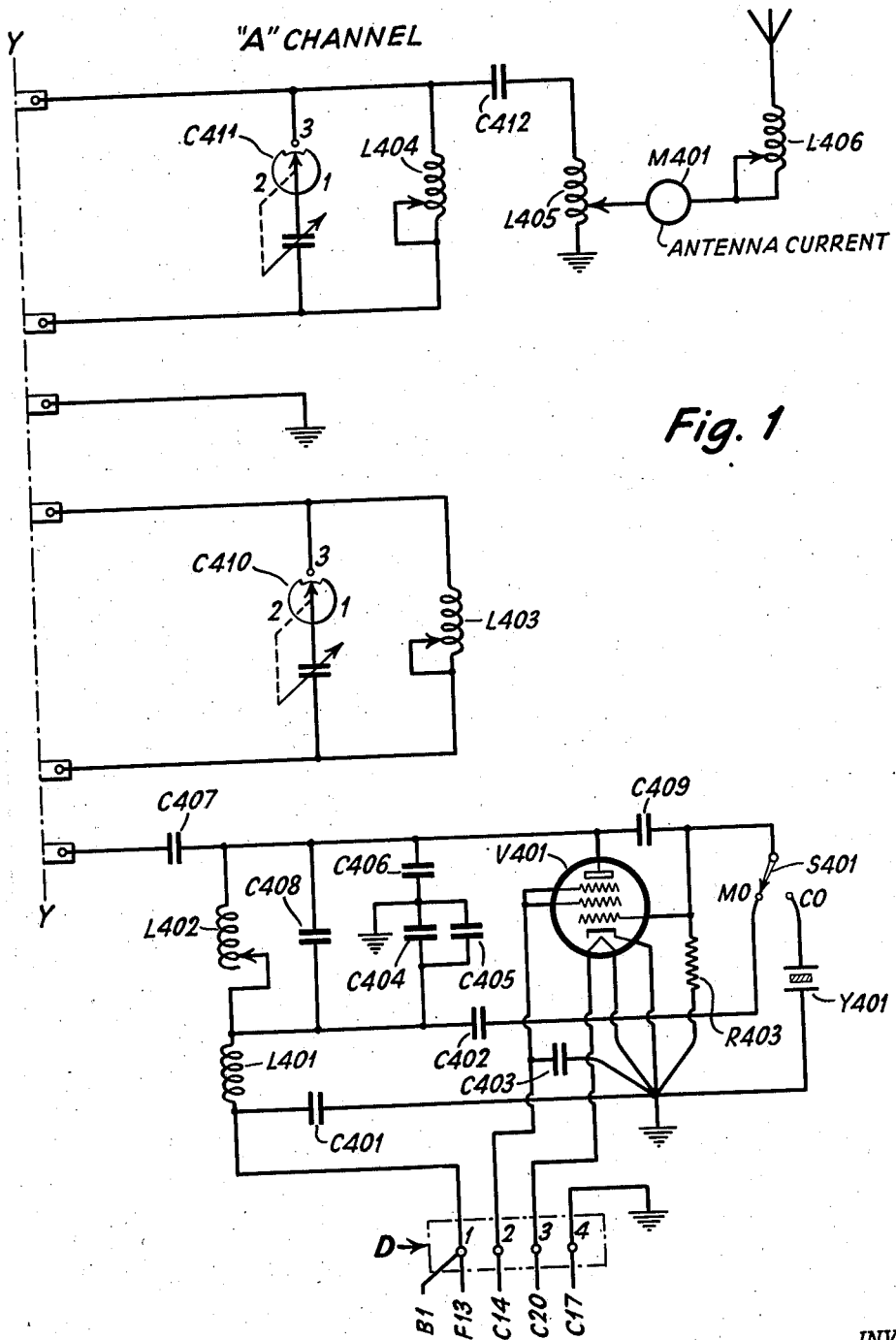
Figure 2:
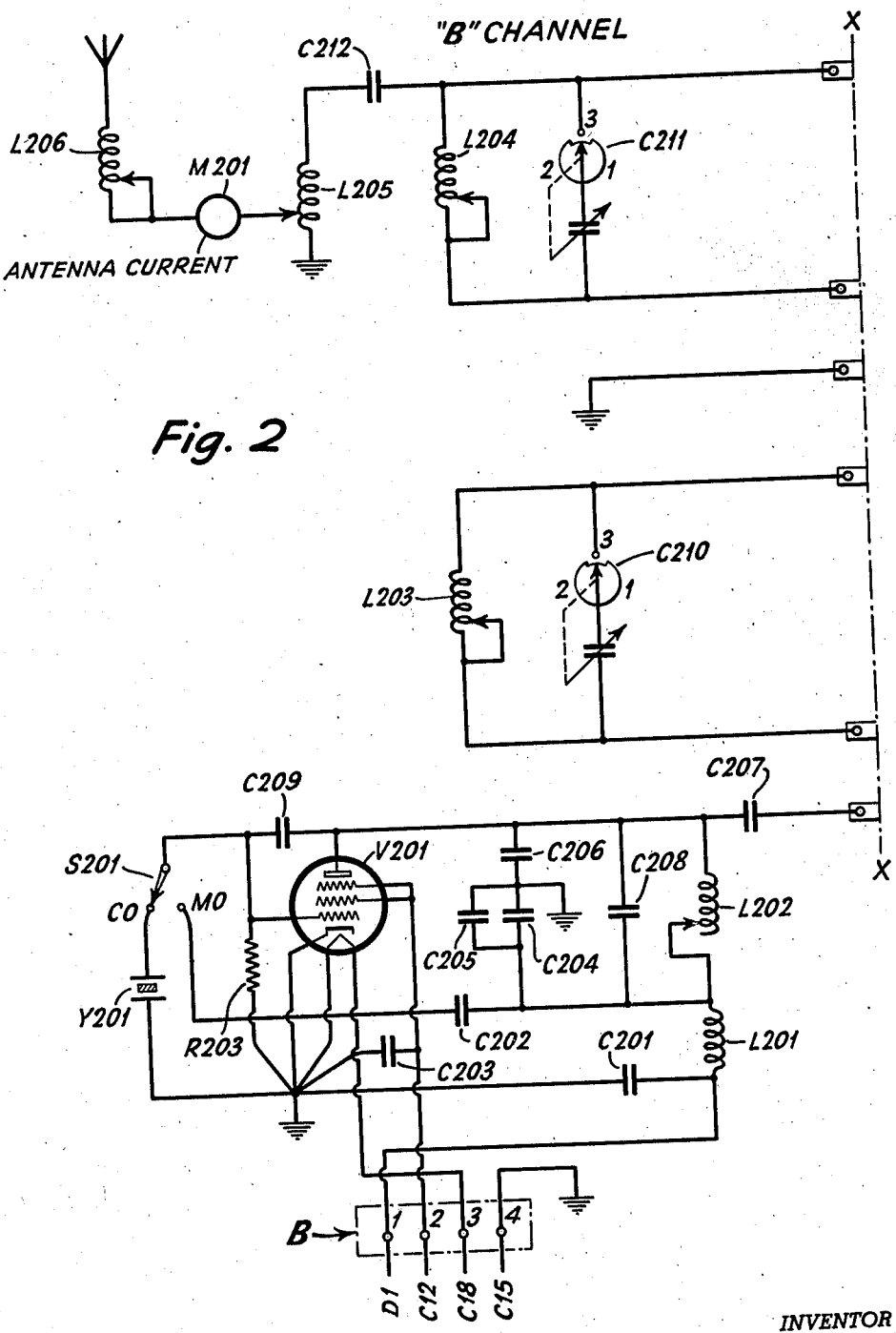

The letters A, B, C, D, E, F, G, H and P designate various terminal boards and indicate the manner in which Figures 1 to 8 inclusive, are to be connected together to form the complete transmitting system. For example, consider terminals 1, 2, 3 and 4 within the rectangle or terminal board B (see Fig. 2). Immediately below 1 appears the legend 1D. This means that terminal 1 on block B should be connected to terminal 1 on terminal block D (see Fig. 1). Similarly, terminal 2 on terminal board B (Fig. 2) has the legend 12C immediately beneath. This means that terminal 2 on board B of Fig. 2 is to be connected to terminal 12 on rectangle or terminal block C (see Fig. 3), etc.

RADIO FREQUENCY CHANNEL A

Referring to Fig. 1, it will be seen that radio frequency channel A comprises a tube V401. By means of a switch S401, crystal Y401 may be switched across the grid resistor R403 so as to be in shunt to the grid and cathode of tube V401. As illustrated the screen grid and suppressor are tied together and grounded through condenser C403. Regenerative feed-back takes place through condenser C409. With crystal control the plate circuit consists of coil L402 and condenser C408 connected in parallel and through condensers C404 and C405 to ground. An additional condenser C406 connected between plate and ground also forms part of the plate circuit. Condenser C409 is made sufficiently small so that with the crystal removed from its holder or socket, the circuit fails to oscillate.

For increased flexibility switch S401 permits operation of the oscillator tube at the same or different frequency without reliance upon the crystal for frequency control. Thus, when the switch is moved to the position indicated, the plate circuit described above, is effectively grounded at some intermediate point and the plate and control grid are connected to opposite terminals of condenser C408, it being noted that condenser C402 serves to block direct current voltage from the grid while permitting free passage of high frequency currents. Condenser C408 is arranged so as to be actuated by a bimetallic strip which causes its capacity to vary with changes in ambient temperature in such a way as to compensate drifts in frequency produced by changing temperature.

Output from oscillation generator V401 is fed through condenser C407 and through switch S303 when thrown to its right-hand position to the grid of intermediate power amplifier tube 807. For channel A operation it will be understood, of course, that switch S304 is in its right-hand position thereby connecting tuned circuit formed by condenser C410 and coil L403 to the plate of the intermediate power amplifier 807.

The output of the power amplifier 807 is fed through condenser C305 in parallel to the grids of the paralleled final power amplifier stages or tubes 813. The latter, for channel A operation, are connected through switch S306 and through switch S305 to the tuned channel A output circuit consisting of condenser C411 and coil L404 connected in parallel. The A channel antenna is connected to the output circuit by way of inductors 406 and 405 and condenser C412 as shown.

It is to be noted, referring to Fig. 1, that a segmental switch is provided for the condensers C410 and C411 in the output circuit of the power amplifiers. These condensers, by virtue of the switches, mounted on their shafts, are arranged so as to be completely removed from circuit, which is desirable for the highest frequency of operation. Other positions of the shaft enable preselected values of capacity to be added to the plate circuits and these, together with simultaneous adjustment of the plate circuit coils, allows rapid extension of the tuning range of the transmitter.

Figure 3:
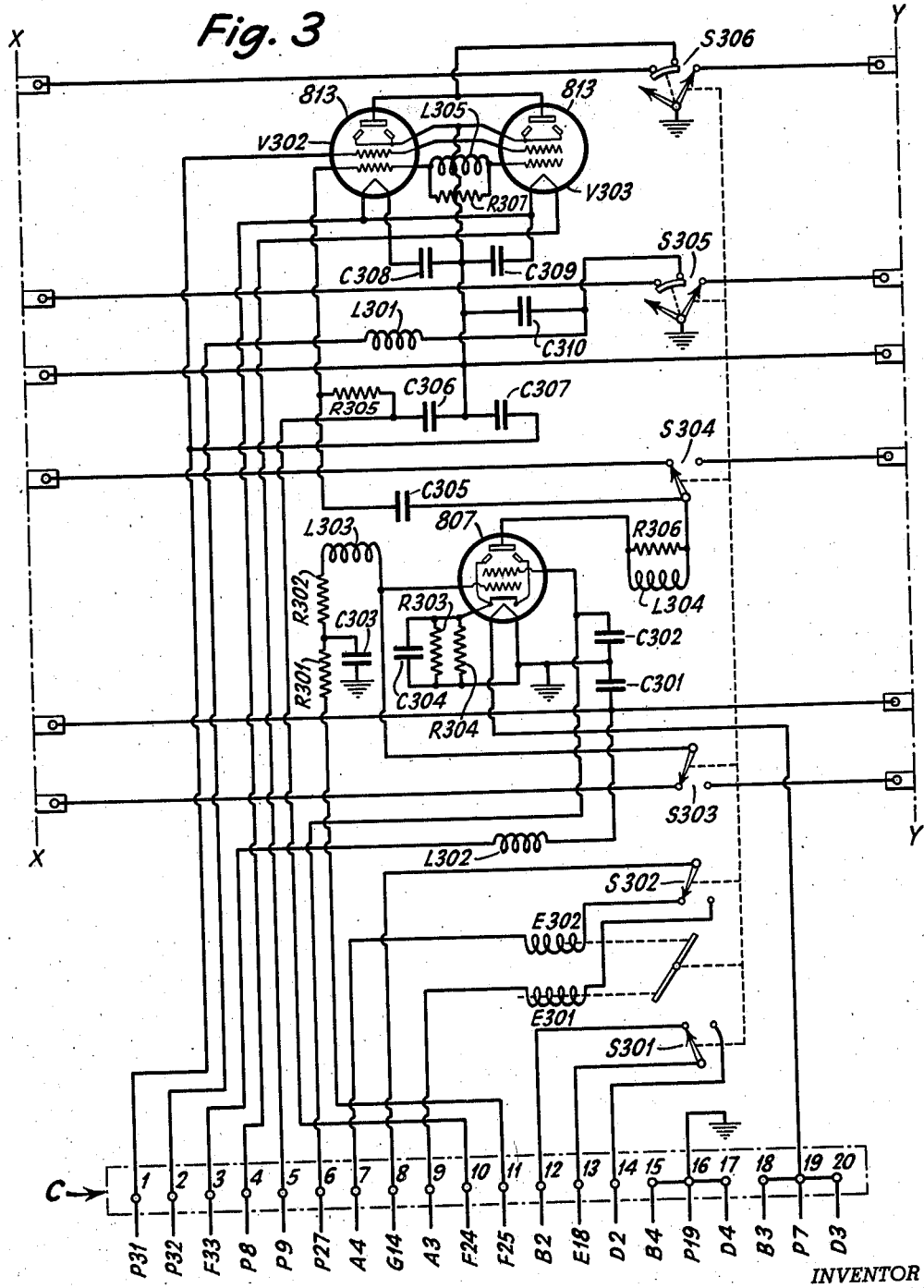
Figure 3 is a wiring diagram of the common intermediate and final power amplifier tube arrangement of my transmitter. By placing Figures 1, 2 and 3 together, along the lines XX and YY, the complete wiring diagram for the entire radio frequency end of my transmitting system is obtained.

It will be noted by referring to Figures 1, 2 and 3 that when channel A is connected for high frequency operation both terminals of the output circuit L204, C211 of channel B are directly grounded through switches S306 and S305. This grounding effectively short-circuits the B channel output circuit and thereby prevents any currents from being set up therein by virtue of stray coupling to the active circuits.

Such switching will be found unnecessary for the intermediate power circuits since they can be conveniently shielded.

RADIO FREQUENCY CHANNEL B

The B channel apparatus illustrated in Fig. 2 and operating through the common power amplifier tubes of Fig. 3 is identical in all respects, except as to operating frequencies, to the apparatus and circuit of the A channel of Fig. 1. Hence, further detailed description of the B channel or Fig. 2 is deemed unnecessary. It will be noted, however, that corresponding elements in the B channel, have been marked with a "200" series rather than the "400" series employed in connection with Fig. 1. Thus, for example, the crystal of Fig. 2 corresponding to crystal Y401, of Fig. 1, is Y201 of Fig. 2.

Also it is to be noted in connection with Fig. 3 that switches S301 to S306 inclusive, are mounted upon a common shaft, as indicated, which is electromagnetically operated by solenoids E301 and E302. Actuation of solenoid E302 places channel B into operation whereas operation of solenoid E301 places channel A into operation.

AUDIO FREQUENCY CIRCUITS

Figure 4:
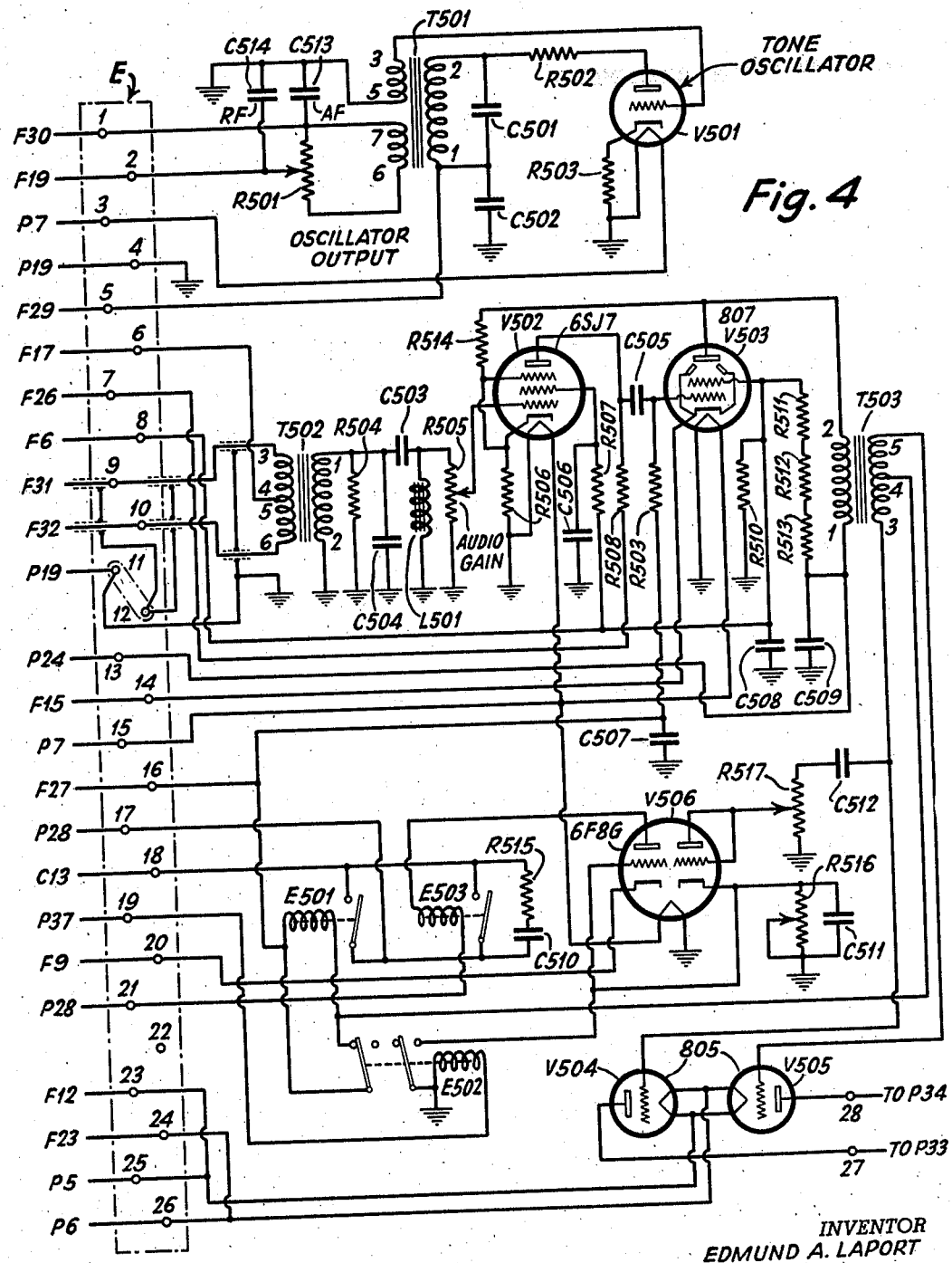
Figure 4 is a wiring diagram of the tone generator, audio amplifier and modulating tubes used in connection with my transmitter.

The major portion of the audio frequency equipment used in connection with my improved transmitting system is shown in wiring diagram form in Fig. 4. Briefly, tube V501 is employed as a tone oscillator; tubes V502 and V503 are employed as audio amplifier tubes; tubes V504 and V505 are used as class B modulators and tube V506 is used as part of an electronic switching system to cut off high frequency carrier currents in the absence of voice and MCW signals.

The tone oscillator tube V501 of Fig. 4 is provided with a tuned plate circuit including the right-hand winding of transformer T501 shunted by condenser C501. Feed-back is established through the upper left-hand secondary of the transformer. Output is taken from potentiometer R501 which operates as a constant load for the oscillator. Condensers C513 and C512 are audio frequency by-pass condensers. Condenser C514, however, is a radio frequency by-pass condenser for protective purposes. This condenser by-passes RF potentials which may be induced into unshielded key leads by radiation from the antenna.

The output of the tone oscillator is connected in series with the key jack J602 (Fig. 5) and the keyed tone is then fed to the primary of transformer key 502 of Fig. 4. It is to be noted, however, that as shown in Fig. 5, switch S606 is in its upper position effectively connecting the microphone jack J601 of Fig. 5 to the primary of transformer T502 of Fig. 4.

Signal waves fed through the secondary of transformer T502 are impressed as illustrated upon the control grid of tube V502 through a high-pass filter consisting of resistor 504, condensers C504 and C503 and inductance L501, so arranged as to by-pass to ground frequencies below 400 cycles. Since the plate circuit of tube V503—a beam tube—is of high impedance, changes in loading produced by varying modulating grid currents causes distortion. This is remedied by the inverse feed-back circuit through resistor 514 to the cathode and suppressor electrodes of tube V502 which is a pentode type of tube. This inverse feed-back circuit lowers the effective plate impedance of tube V503 to such a value that its output is virtually independent of load variations, thus reducing the intrinsic distortion.

For voice and MCW signalling the amplified output of the audio amplifier appearing in the secondary of transformer T503 (Fig. 4) is used to turn on the carrier in whichever frequency channel of the transmitter is connected for operation, and also to plate and screen grid modulate the final power amplifier tubes.

Carrier power is put on the air in this way, it being noted that the purpose of this arrangement is to enable two-way communication on the same carrier frequency. Voltage is taken from one of the modulator tube grids through condenser C512 and resistor R517 which is a potentiometer and impressed across the rectifier elements on the right-hand side of tube V506. The rectified voltage or current builds up a potential across the adjustable time constant circuit consisting of resistor R516 and condenser C511. This voltage is used in turn as control grid potential for the left-hand triode section of tube V506. In the presence of signal waves, current flow through the triode section syllabically operates relay E503. The contacts of this relay, when closed, impress, through switch S301 (Fig. 3) a positive voltage on the screen and suppressor grids, which are tied together in the oscillators of channels A or B. This positive voltage permits the generation of carrier wave oscillations. In the absence of signal waves, relay E503 (Fig. 4) opens, after a time interval determined by the adjustment of the time constant circuit R516, C511, of Fig. 4. Opening of the relay contact opens the screen grid-suppressor circuit of either oscillator A or B causing the oscillator to block.

In the same manner relay E501 (see Fig. 4) keys the transmitter telegraphically. Relay E501 is operatively placed into circuit by actuation of relay E502, in turn operated by dialing. Keying relay E501 (Fig. 4) is operated by rectified grid current from the modulator tubes V504 and V505, which during CW keying are operated at zero plate voltage. It is to be noted that when relay E502 of Fig. 4 is operated the same dialing process operates relay E701 of Fig. 7, opening the direct current feed to the mid-point of one winding of transformer T704 and short-circuiting to the two secondary windings. Now referring to Fig. 4 again, under the last mentioned condition, the application of audio potentials across the secondary of coupling transformer T503 causes grid current to flow from the modulator tubes V504 and V505, through the center tap on the secondary of transformer T503 to the coil of relay E501 and thence to ground.

When signalling with voice or MCW the modulator tubes V504 and V505 are operated with full plate voltage. The amplified outputs of these modulator tubes are fed from the primary of transformer T704 (Fig. 7) into the two secondaries, the left-hand one of which impresses voltages on the screen grids and the right-hand one of which impresses voltages on the plates of the final power amplifier tubes V302 and V303 of the 813 type (see Fig. 3).

CONTROL CIRCUITS

*General*

Figure 9:
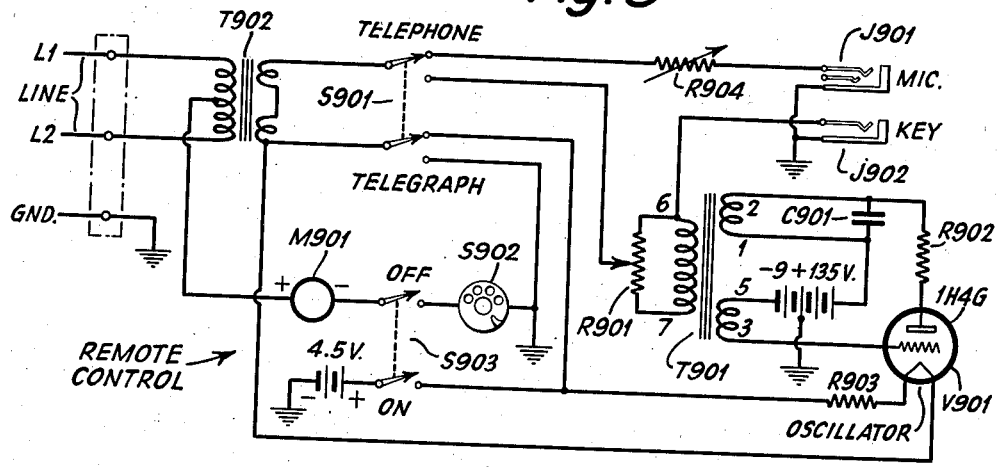
Figure 9 is a wiring diagram of a remote control unit which may be employed with my transmitting system.

The control circuits of the transmitter have been so designed that complete control is possible from either the front panel of the transmitter, having thereon the controls of Fig. 5, which is designated as "Local" control or from the remote control unit of Fig. 9, which is designated as "Remote" control.

Figure 10:
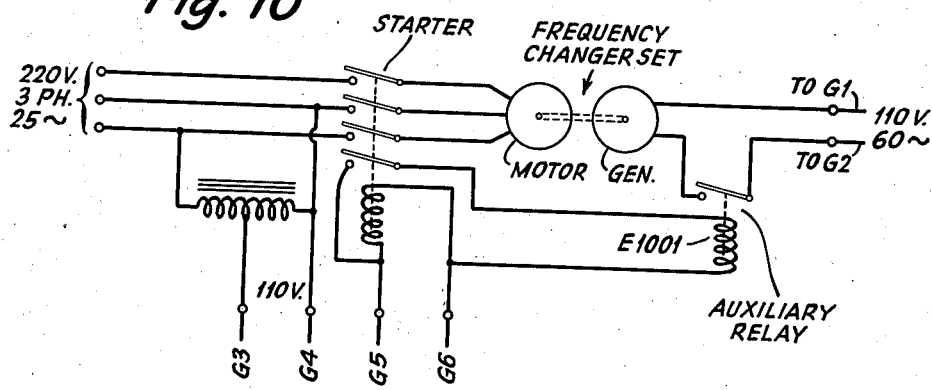
Figure 10 is a wiring diagram of a frequency changer which may be used with my transmitter.

When operating the transmitter from a 220 volt 3 phase 25 cycle power source, rather than from a 60 cycle source, complete control of the frequency changer of Fig. 10 is provided from both Local and Remote operating positions.

Thus, basically, four different types of control are possible. These are:

1. Local control on 60 cycles
2. Remote control on 60 cycles
3. Local control on 25 cycles
4. Remote control on 25 cycles The control sequence for each of these modes of operation will be explained. In these analyses it is assumed that both radio frequency channels A and B are tuned and ready to operate.

Basically, the transmitter control relays may be divided into two general groups. The first group includes the D. C. relays which select and set up the circuits for either channel and for different types of emission. In the second group are the A. C. relays which perform the routine functions of starting, operating, overload protection and shutting down.

*Local control on 60 cycles*

The four links, T, U, V, W (see Fig. 7), on the main power terminal board must be on the side marked "60 cycles," and the 110 volt 60 cycle supply connected to terminals 3 and 4 on terminal block G. Terminals 1, 2, 5 and 6 are used only for 25 cycle operation. Terminals 7 and 8 are for the telephone or control line when remote control is employed.

(1) Closure of the main power switch S701 (Fig. 7) located on the lower front panel applies line voltage to:
  (a) The rectifier compartment heater circuit consisting of the heater R101 (Fig. 6) and the thermostat E117 (Fig. 6) which closes when the ambient temperature drops below +15° C.
  (b) The A. C. control circuit through fuses F103 and F104 (Fig. 7). The A. C. relays are now ready to operate when the interlocking D. C. relays are closed.
  (c) The primary of transformer T101 (Fig. 6), which supplies voltage to the copper oxide rectifier CR101 (Fig. 6). This rectifier furnishes approximately 24 volts D. C. for the D. C. control relays. As the rectifier ages the output voltage will decrease since its internal resistance increases. To compensate for this decrease in voltage two additional taps arranged to supply a slightly higher voltage are provided on the secondary of T101.

(2) When the "off-on" switch S603 (Fig. 5) controlling the dialing circuits, is closed it energizes the quick acting impulsing relay E110, (Fig. 6).

(3) The closure of E110 energizes the quick make slow release relay E112 (Fig. 6).

(4) Closure of E112 performs three functions:
   (a) Completes the circuit to the coil of the anti-chatter relay E113 and to the coil of the rotary stepping relay E111 through the wiper and the "home" contact on the A bank of E111. These relays are now ready to receive dialing impulses.
   (b) Closes auxiliary relay E109.
   (c) Opens the automatic homing circuit, or D bank of contacts, of E111 to permit selective dialing.

(5) When the auxiliary relay E109 closes, its NO (normally open) contacts energize E101 through the NC (normally closed) contacts of E104, the 60 cycle U link (Fig. 7) and the door interlock switches S702, S703 and S704 (Fig. 7).

Figure 8:
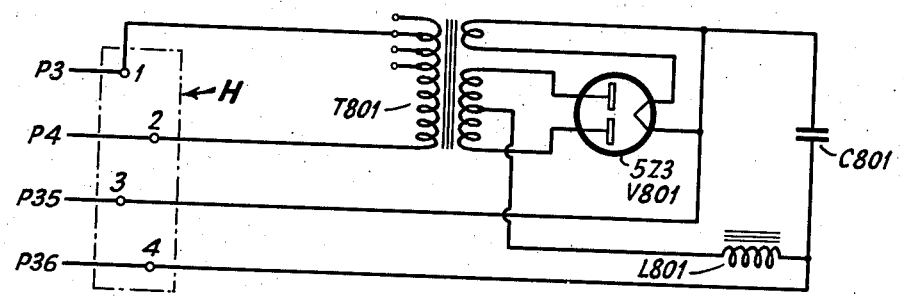
Figure 8 is a wiring diagram of a rectifier supplying biasing potential for certain tubes of my transmitter.

(6) The closure of E101 is the first step in the sequence of operation of the A.-C. relays and performs the following functions:
   (a) Seals itself across the line independently of E109 (Fig. 6) which previously closed E101.
   (b) Applies primary voltage to the filament transformer T701 (Fig. 7) and the bias transformer T801 (Fig. 8). The filaments of all tubes are now lighted and the bias power supply of Fig. 8 operating so that fixed bias is supplied to the tubes.
   (c) Connects the coil of the time delay relay E102 (Fig. 6) across the line through the NC contact of E103. After a delay of approximately thirty seconds, to permit the filaments of rectifier tubes 872 and 866 of Fig. 6 to reach proper operating temperature, the contacts of E102 close.

(7) The coil of E106 is connected across the line through the NC contact of E105 and one of the contacts of E101 when the time delay relay contacts E102 close.

(8) When E106 (Fig. 6) closes it seals itself across the line independently of E102 and in addition:
   (a) Energizes E105
   (b) Prepares the coil circuit of the plate contactor E114 for closing.

(9) Closure of E105 transfers the contacts of the time delay relay E102 from E106, which has now sealed itself across the line, to E104. This new circuit is used later for the shutting down sequence. E104 is not energized since the NC contacts of E109 are now open.

(10) At this stage nothing more will happen until the dialing operation is executed. The circuits are now ready for the selection of channel A or B and the type of emission. This is accomplished by dialing local dial S602 (Fig. 5).

(11) The dialing consists of dialing one to four impulses depending on the channel and type of emission desired. The number of impulses for each of the four dial positions are:

| | Channel and emission | Impulses |
|---|---|---|
| A | MCW (modulated continuous wave) or R/T (radio telephone) | 1 |
| A | CW | 2 |
| B | MCW or R/T | 3 |
| B | CW | 4 |

(12) Dialing impulses are actually space intervals during which the control current to quick acting impulsing relay E110 (Fig. 6) is momentarily broken. With each current interruption due to dialing, E110 opens, and on each drop out its back contacts momentarily close. This completes the ground return of the 24 volt circuit to the coil of the rotary stepping relay E111 and the anti-chatter relay E113. Therefore, every time E110 opens, E111 and E113 receive a positive pulse of current. In a like manner, whenever the front contacts of E110 close, E112 receive a positive pulse of current.

(13) Relay E112 is already closed (paragraph 3) and since it is a slow release relay it holds in during the impulsing action of E110.

(14) The coil of the quick close slow release relay E113 is in parallel with the coil of E111. Both of these coils receive the first impulse of current from E110 through the "home position of the stepping relay on the A bank of contacts. As soon as E113 receives the first impulse of current it closes and maintains the circuit which would otherwise be opened as E111 moves off the "home" position. E113 holds in for the duration of the positive pulses of current from E110 so that both E113 and E111 receive the pulses through the now closed NO contact on E113.

(15) With every positive pulse of current the rotary stepping relay E111 advances one position. Depending on the number of impulses dialed E111 will move up from one to four positions to select the channel and type of emission desired.

(16) Since E113 is a slow release relay it remains closed as long as it receives positive impulses from E110. In addition to sealing the impulsing circuit when E111 moves off the "home" position the closure of E113 performs two additional functions:
   (a) Removes voltage from the B and C banks of contacts of E111. This prevents chattering of the relays connected to those two banks of contacts as the rotary wiper passes the individual contacts during dialing.
   (b) Opens the auxiliary relay E109 which in turn, opens the coil circuit of E114. This prevents plate and screen voltages from being applied to the circuits of the transmitter during dialing. This protects the channel switch contacts from arc-overs.

(17) After the impulsing dial S602 (Fig. 5) has returned to rest E110 (Fig. 6) and E112 remain closed but E113 falls out. E111 remains on positions one to four depending on the number of impulses received.

(18) The dropping out of E113 on the completion of dialing performs three functions:
   (a) The circuit to the coils of E111 and E113 is opened and cannot be reclosed as long as E112 remains energized. Therefore, further dialing does nothing to E111 or E113.
   (b) 24 volts D.-C. is again applied to the B and C banks of contacts of E111 (Fig. 6). Depending on the channel and emission dialed relays E107 (Fig. 6) and E502 (Fig. 4) will be energized if the stepping relay wiper has stopped on their contact.
   (c) Energizes E108 (Fig. 6) which in turn, prepares the circuit of the plate contactor E114 for closing when the "plate ON" switch S604 (Fig. 5) is closed. This switch is manually operated and normally closed except for test purposes. E114 cannot be energized unless the overload relay E115 is in.

(19) The closure of the "plate ON" switch S604 (Fig. 5) energizes E114 (Fig. 6) which, in turn, applies voltage to the primary of the high voltage transformer T702 (Fig. 7) and intermediate voltage transformer T703 (Fig. 7). Transformer T702 (Fig. 7) energizes rectifier tubes 872 (Fig. 6), whereas transformer T703 energizes tubes 866 (Fig. 6).

(20) When the high voltage builds up through its filter L701, etc. (Fig. 7), it closes E103 (Fig. 6) which is in series with the bleeder resistor R701 (Fig. 7).

(21) Closure of E103 (Fig. 6) removes line voltage from the coil of the time delay relay E102 and transfers the coil to the normally closed contacts of E109 which is now open. The removal of voltage from the coil of E102 permits it to recycle almost instantly should this need arise.

(22) The transmitter is now ready for operation on the channel and type of emission as previously dialed.

(23) In step 15 is was pointed out that E111 will move from one to four positions depending on the channel and type of emission desired. Channel selection is determined by the C bank of contacts of E111 and the auxiliary channel relay E107:
   (a) When channel B is dialed the rotary wiper of the stepping relay E111 stops on the third or fourth position depending on the type of emission desired (see paragraph 11) and closes E107.
   (b) Closure of E107 (Fig. 6) energizes solenoid E301 (Fig. 3).
   (c) When E301 (Fig. 3) is energized it pulls the channel switch assembly of Fig. 3 to the "B" position.
   (d) Just before the channel switch reaches the limit of its travel an arm (not shown) on the solenoid link strikes and opens the auxiliary switch S302 (Fig. 3). This removes voltage from the actuating solenoid E301 at the completion of the switching operation.
   (e) When channel A is dialed E111 stops on one of the first two positions, depending on the type of emission dialed (see paragraph 11), and E107 (Fig. 6) opens
   (f) The opening of E107 energizes solenoid E302 (Fig. 3) which pulls the channel switch to the A position.
   (g) At the completion of the switching operation S302 (Fig. 3) removes the line voltage from solenoid E302.
   (h) It will be noticed that whenever E111 (Fig. 6) returns to the "home," first or second position, that E107 will open and cause the channel switch to move to the A position. Therefore, whenever only a single frequency is to be employed, or one frequency is to be used more than another, that frequency should be set up on the A channel. This will result in quieter operation and save wear and tear on the channel switch.

(24) Selection of the type of emission is controlled by the B bank of contacts on the stepping relay E111 (Fig. 6).
   (a) When CW is dialed on dial S602 (Fig. 5) E111 stops on either the second or fourth position depending on the channel desired (see paragraph 11). This energizes the CW-R/T-MCW selection relay E502 (Fig. 4).
   (b) Closure of E502 connects the keying relay E501 into the grid bias return of the modulator tubes and disables the voice operated carrier control explained previously.
   (c) When E701 (Fig. 7) closes it shorts the secondaries of the modulation transformer T704 and removes plate voltage from the modulator tubes.
   (d) For CW operation the "telephone-telegraph" switch S606 (Fig. 5) must be set on "telegraph." This applies plate voltage to the audio oscillator V501 (Fig. 4) which is used to furnish the keying tone. In addition it connects the audio oscillator to the input transformer T502 of the audio system through transformer T601 (Fig. 5).
   (e) When R/T and MCW are dialed E111 (Fig. 6) stops on either the first or third position depending on the channel selected. This causes E502 (Fig. 4) to open or to remain open when starting up, (f) The opening of E502 (Fig. 4) shorts the coil of keying relay E501 and removes the short from the timing circuit of the voice operated carrier tube V506 (Fig. 4). E701 (Fig. 7) also opens.

(g) The opening of E701 removes the shorts from the secondaries of the modulation transformer T704 and applies plate voltage to the modulators.

(h) Either R/T or MCW is selected by means of the "telephone-telegraph" switch S606 (Fig. 5). When this switch is in the "telephone" position it connects the microphone to the input circuits. In the "telegraph" position the keying audio oscillator V501 (Fig. 4) is energized and connected into the audio input circuits.

(25) To change channels or emission, a new dialing operation is required. Return the "off-on" toggle switch S603 (Fig. 5) to "off" for approximately one second and then reclose. This opening and reclosing of S603 is equivalent to momentarily hanging up the receiver before redialing on the familiar automatic public telephone. In other words, after a dialing operation is completed the dial is disabled and further dialing will produce no change. To render the dial operative again, switch S603 must be moved to its "off" position for about one second and then returned to "on."

(a) Opening switch S603 (Fig. 5) releases relay E110 (Fig. 6) which permits relay E112 to drop out.

(b) As soon as E112 drops out it opens E109 whose NC contacts reclose and apply voltage to the coil of the time delay relay E102 through the NO contact of E103.

(c) When E112 (Fig. 6) drops out it also closes the circuit to the interrupter springs on the rotary switch E111 whose coil then receives impulses from these interrupter springs until the circuit is opened when the bridging wiper on the D bank reaches the open contact at the "home" position. The interrupter springs operate in exactly the same manner as the contacts on a common door bell or buzzer.

(d) Since the coil of relay E113 (Fig. 6) is in parallel with the coil of E111 it is closed by the pulses from the interrupter springs.

(e) E113 closes on the first pulse received and in closing removes the voltage from the B and C banks of contacts of E111 and thus prevents chattering of E107, E502 and E701 as the wiper moves around. The closing of E113 opens E106 which, in turn, opens the plate contactor E114 removing high and intermediate voltage from the equipment. E103 opens, but the coil of E102 still remains connected to the line through E101.

(f) E111 stops rotating when it reaches the next "home" position since the automatic impulsing circuit is broken by the open contact at that point on the D bank.

(g) After the last pulse has been received E113 falls out. However, the auxiliary relay E103 does not reclose, and re-apply high voltage to the circuits, since its return circuit has also been opened at the "home" contact on D bank.

(h) Reclosure of S603 (Fig. 5) causes the same sequence of starting operations as has been outlined, except that E106 (Fig. 6) is already locked in and it is not necessary to wait thirty seconds for E102 (Fig. 6) to reclose. The new dialing operation resets the selective control circuits in the same manner as previously outlined.

(i) On the completion of the re-dialing sequence high and intermediate voltage is immediately applied to the circuits and the transmitter is ready for operation. E103 (Fig. 6) closes and removes voltage from the time delay relay E102 (Fig. 6) which then returns to its starting position for the next starting cycle.

(26) If S603 (Fig. 5) is opened and not reclosed within thirty seconds the transmitter shuts down in the following manner:

(a) The first part of the closing down sequence is the same as outlined in paragraphs 25(a) and 25(g) inclusive.

(b) E102 (Fig. 6) continues to run until thirty seconds have elapsed, at which time its contacts close and energize E104 through the NC contacts of E109 (Fig. 6).

(c) The closure of E104 breaks the seal on E101 (Fig. 6) which then opens.

(d) When E101 (Fig. 6) opens it removes primary voltage from the filament transformer T701 (Fig. 7) and from the bias transformer T801 (Fig. 8).

(e) The opening of E101 (Fig. 6) also breaks the seal on E106 which now opens de-energizing E105 (Fig. 6).

(f) All circuits are now in their initial de-energized condition corresponding to paragraph (1).

(27) When operating, "standby" may be dialed in the following manner:

(a) Return the "off-on" switch S603 (Fig. 5) to the "off" position and then reclose. This sequence is the same as covered in paragraphs 25(a) and 25(h) inclusive. The transmitter is now on "standby" with filaments hot but with no high or intermediate voltage on any of the circuits.

(b) To come back on the air simply redial the frequency and emission desired and the transmitter is ready for immediate use. This action is covered in paragraph 25(i).

(28) When an overload occurs in the high voltage rectifier circuit, the overcurrent acts through the D.-C. coil for E115 and through its NC contact releases E114 which shuts off the intermediate and main rectifiers.

(29) Operation of E115 (Fig. 6) on an overload causes its contact to be held open by a mechanical latch. E115 is reset by dialing "standby" as outlined in paragraph 27 immediately above. The reset coil is energized whenever the rotary relay E111 returns to "home" position since the wiper arm on the C bank of contacts completes the circuit through one of the normally closed (NC) contacts on E113.

REMOTE CONTROL ON 60 CYCLES

To control the transmitter from a remote location it is necessary to use the remote control apparatus shown in Fig. 9, fully equipped with batteries and vacuum tube. This is connected to the transmitter by a balanced two wire line and ground return. It is to be noted that the transmitting system herein described has been especially devised so as to enable performance of numerous and complicated functions with only a single tone over a simple two wire control line with ground return.

The connections to the main power terminal board are the same as for local control on 60 cycles, except that the two wire telephone line L1, L2 (Fig. 9) is connected to terminals 7G and 8G (Fig. 7) and thence to 10F and 11F (Fig. 5).

The "remote-local" switch S605 (Fig. 5) must be on "remote." This connects the input transformer T502 (Fig. 4) to the telephone line and remote control.

When operating on remote control the "plate on-standby" switch S604 (Fig. 5) must be in the "plate on" position since there is not control of this switch from the remote point. S604 is intended primarily as an aid when testing or tuning up, "standby" when operating being obtained by dialing as described in paragraph 27 immediately above.

The main "off-on" S701 (Fig. 7) switch is left "on" at all times. This provides power for the control relays and heat, when necessary, for the rectifier tube compartment. This is important since the temperature of the rectifiers must always be above +15° C. when operating. Since the automatic thermostat E117 (Fig. 6) maintains the compartment at this minimum temperature when the cover is on, the transmitter is always ready to come on the air without delay even if the ambient temperature is as low as −40° C.

Control from the remote position is now the same as for local operation except that S602 and S603 (Fig. 5) have been replaced by S902 and S901 (Fig. 9). This description is covered above headed "Local Control on 60 Cycles."

To provide a check on the operation of the control circuits from the remote point the "remote line" meter M901 (Fig. 9) is connected in the ground return circuit. This meter will read only when (a) The main power switch S701 (Fig. 7) is closed
(b) The "remote-local" switch S605 (Fig. 5) is on "remote"
(c) The telephone line and ground return circuit are connected and continuous Depending on the resistance of the telephone line and ground return the "remote line" current will be approximately 25 to 40 milliamperes when operating properly. For reliable operation the total resistance of the ground return and paralleled lines should not exceed 500 ohms.

LOCAL CONTROL ON 25 CYCLES

The transmitter can be operated from a 200 volt, 3 phase, 25 cycle power supply when provided with a frequency changer as shown in Fig. 10. This is a 220 volt, 3 phase, 25 cycle motor coupled to a 115 volt, single phase, 60 cycle alternator and field exciter, together with the necessary operating controls.

The four links, T, U, V, W (Fig. 7) on the main power terminal board should be shifted over to the side marked "25 cycles." The 110 volt, 60 cycle supply from the alternator connects to terminals 1G and 2G while the 110 volt, 25 cycle supply from the transformer in the frequency changer connects to terminals 3G and 4G. The magnetic starter and auxiliary relay are connected to terminals 5G and 6G. Terminals 7G and 8G are for the remote control line when used.

The "remote-local" switch S605 (Fig. 5) should be in the "local" position.

(1) Closure of the main power switch S701 (Fig. 7) located on the lower front panel applies line voltage to:
   (a) The rectifier compartment heater circuit consisting of the heater R101 (Fig. 6) and the thermostat E117 (Fig. 6) which closes when the ambient temperature drops below +15° C.
   (b) The primary of transformer E101 (Fig. 6), which supplies voltage to the copper oxide rectifier CR101 (Fig. 6). This rectifier furnishes approximately 24 volts D.-C. for the D.-C. control relays.
   (c) The frequency changer control circuits through fuses F703 and F704.

(2) When the "off-on" switch S603 (Fig. 5) is closed it energizes the quick acting impulsing relay E110.

(3) The closure of E110 (Fig. 6) energizes the quick make slow release relay E112 (Fig. 6).

(4) Closure of E112 performs three functions:
   (a) Completes the circuit to the coil of the anti-chatter relay E113 and to the coil of the rotary stepping relay E111 through the wiper and the "home" contact on the A bank of E111. These relays are now ready to receive dialing impulses.
   (b) Closes auxiliary relay E109.
   (c) Opens the automatic homing circuit of E111 to permit selective dialing.

(5) When the auxiliary relay E109 closes, its NO contacts energize the 25 cycle relay E116 through the NC contacts of E104.

(6) Closure of E116 which follows—
   (a) Energizes the auxiliary relay E1001 (Fig. 10) which completes the circuit between the 60 cycle alternator and terminals 1G and 2G.
   (b) Operates the line starter of the frequency changer which now comes up to operating speed.
(7) As the frequency changer accelerates, the potential across 1G and 2G increases closing E110 through the U link, E104 and the interlock switches.
(8) With 110 volts, 60 cycles now available on the A.-C. control circuits, the closure of E110 (Fig. 6) corresponds to step (6) in the description of operation with "Local control on 60 cycles." The remainder of the starting up and operating functions are identical to those described in that section.
(9) To shut down, S603 (Fig. 5) is returned to "off."
(10) Opening switch S603 (Fig. 3) releases relay E110 (Fig. 6) which permits relay E112 to drop out.
(11) As soon as E112 (Fig. 6) drops out it opens E109 whose NC contacts reclose and apply voltage to the coil of the time delay relay E102 through the NO contact of E103.
(12) When E112 (Fig. 6) drops out it also closes the circuit to the interrupter springs on the rotary switch E111 whose coil then receives impulses from these interrupter springs until the circuit is opened when the bridging wiper on the D bank reaches the open contact at the "home" position. The interrupter springs operate in exactly the same manner as the contacts on a common door bell or buzzer.
(13) Since the coil of relay E113 (Fig. 6) is in parallel with the coil of E111 it is closed by the pulses from the interrupter springs.
(14) E113 (Fig. 6) closes on the first pulse received and in closing removes the voltage from the B and C banks of contacts of E111 and thus prevents chattering of E107 (Fig. 6), E502 (Fig. 4) and E701 (Fig. 7) as the wiper moves around. The closing of E113 opens E108 which, in turn, opens the plate contactor E114 (Fig. 6) removing high and intermediate voltage from the equipment. E103 (Fig. 6) opens, but the coil of E102 (Fig. 6) still remains connected to the line through E101 (Fig. 6).
(15) E111 (Fig. 6) stops rotating when it reaches the next "home" position since the automatic impulsing circuit is broken by the open contact at that point on the D bank.
(16) After the last pulse has been received E113 (Fig. 6) falls out. However, the auxiliary relay E108 (Fig. 6) does not reclose, and reapply high voltage to the circuits, since its return circuit has also been opened at the "home" contact an D bank.
(17) E102 (Fig. 6) continues to run until thirty seconds have elapsed, at which time its contacts close and energize E104 (Fig. 6) through the NC contacts of E109 (Fig. 6).
(18) When E104 (Fig. 6) closes it breaks the circuit to E116 which then drops out releasing the starter and E1001 (Fig. 10).
(19) When the starter opens the frequency changer drifts to a stop.
(20) The opening of E116 removes 110 volts, 60 cycle power from terminals 1G and 2G permitting E101 (Fig. 6) to open.
(21) The opening of E101—
   (a) Removes primary voltage from the filament transformer T701 (Fig. 7) and the bias transformer T801 (Fig. 8).
   (b) Breaks the circuit to the coil of E116 (Fig. 6) to prevent its closing when the NC contacts of E104 (Fig. 6) reclose.
   (c) Breaks the seal on E106 (Fig. 6) which now opens de-energizing E105 (Fig. 6).
(22) The opening of E105 (Fig. 6) de-energizes E104 (Fig. 6) which now opens.
(23) All circuits are now in their initial de-energized condition corresponding to paragraph 1 under "Local Control on 25 Cycles."

REMOTE CONTROL ON 25 CYCLES

The same remote control of Fig. 9 is used for 25 cycle remote operation as is used for 60 cycle remote operation. The method of operation is identical.

All connections to the main power terminal board are the same as for local control on 25 cycle, except that the telephone line L1, L2 (Fig. 9) is connected to terminals 7G and 8G.

The "remote-local" switch S605 (Fig. 5) must be on "remote." This connects the input transformer T502 (Fig. 4) to the telephone line L1, L2 and remote control of Fig. 9.

When operating from a remote point the "plate on-standby" switch S604 (Fig. 5) should be in the "plate on" position and the main power switch S701 (Fig. 7) ON.

Control from the remote position is now the same for local operation, except that S602 and S603 (Fig. 5) have been replaced by S902 and S901 (Fig. 9). This description is covered in section above labeled "Remote Control on 60 Cycles."

As far as the remote operator is concerned, operation on either 25 or 60 cycles is identical.

Having thus described my invention what I claim is:

1. A transmitting system comprising a plurality of radio frequency channels, each channel including an oscillation generator and a final tuned output circuit, a power amplifier system and means for selectively switching said power amplifier system from the oscillation generator and tuned output circuit of one channel to the oscillation generator and tuned output circuit of the other channel and means operatively associated with said switching means to ground both terminals of the output circuit of that channel which is not operatively connected to the power amplifying system.

2. A transmitting system comprising a plurality of radio frequency channels, each channel including an oscillation generator and a final tuned output circuit, a power amplifier system and means for selectively switching said power amplifier system from the oscillation generator and tuned output circuit of one channel to the oscillation generator and tuned output circuit of the other channel, a modulating circuit connected to the power amplifying system for producing one type of signal emission, another modulating circuit connected to said oscillation generators to produce a different type of signal emission and means for selectively utilizing one of said modulating circuits to control the output of the operating channel of the transmitting system.

3. A transmitting system comprising a plurality of radio frequency channels, each channel including an oscillation generator and a final tuned output circuit, a power amplifier system and means for selectively switching said power amplifier system from the oscillation generator and tuned output circuit of one channel to the oscillation generator and tuned output circuit of the other channel, a modulating circuit adapted to be associated with the power amplifying system for producing one type of signal emission, another modulating circuit adapted to be associated with said oscillation generators to produce a different type of signal emission and means for selectively utilizing one of said modulating circuits to control the output of the operating channel of the transmitting system and impulse responsive means responsive to pre-selected numbers of impulses for selectively connecting the amplifier system to the oscillation generator and output circuit of any one of the channels and for selectively and operatively connecting one of said modulating circuits to the operating channel of the transmitting system.

4. The system, as claimed in claim 3, characterized in addition by the fact that one of said modulating circuits is adapted to modulate the output of the power amplifier system in accordance with audio frequency waves and being further characterized by the provision of additional means, operative in response to presence and absence of audio signal waves, to turn on and off respectively the high frequency output of the amplifier system.

5. A transmitting system comprising a plurality of radio frequency channels, each channel including an oscillation generator and a final tuned output circuit, a power amplifier system and means for selectively switching said power amplifier system from the oscillation generator and tuned output circuit of one channel to the oscillation generator and tuned output circuit of the other channel, a modulating circuit adapted to be associated with the power amplifying system for producing one type of signal emission, another modulating circuit adapted to be associated with said oscillation generators to produce a different type of signal emission and means for selectively utilizing one of said modulating circuits to control the output of the operating channel of the transmitting system and impulse responsive means responsive to pre-selected numbers of impulses for selectively connecting the amplifier system to the oscillation generator and output circuit of any one of the channels and for selectively and operatively connecting one of said modulating circuits to the operating channel of the transmitting system, a source of high voltage for said power amplifier system and means responsive to actuation of said impulse responsive means for preventing the application of high voltage to said amplifier until said impulse responsive means has completed the selective connection of the power amplifier system to a desired channel and the selective connection of a modulating circuit to the channel connected for high frequency operation.

6. A transmitting system having a plurality of high frequency channels, an oscillation generator and a tuned output circuit for each channel, a tube amplifier, means for switching the tube amplifier to an oscillation generator and tuned circuit of a selected channel, a source of alternating current power, a plurality of modulating circuits, means to selectively and operatively connect one of said modulating circuits to the apparatus in the operating channel, a direct current operated dialing system, a low voltage rectifier for rectifying power derived from said source, means for connecting the rectifier to the dialing system whereby rectified power from said low voltage rectifier serves to place the dialing system in operative condition, a high power rectifier connected to said source and for supplying high voltage power to all tubes in the operating channel, means rendering said high power rectifier inoperative until the filaments of said high power rectifier and all tubes in the operating channel have been permitted to warm up for a period of time, disabling means operating after said dialing means has been operated once, to render further dialing inoperative as regards further switching of said tube amplifier and modulating circuits, and means operative at will to disable said disabling means whereby to render said dialing means operative again to selectively switch said tube amplifier and modulating circuits.

7. The system as claimed in claim 6 characterized by the fact that means are provided for grounding the terminals of the output circuit of a disabled channel.

8. Apparatus as claimed in claim 6 characterized by the provision of an overload relay responsive to overloads on said tube amplifier system to remove voltage to be rectified from the high voltage rectifier and means including said dialing apparatus for resetting said overload relay.

9. A transmitting system comprising a plurality of radio frequency channels, each channel including an oscillation generator and a final tuned output circuit, a power amplifier system, and means for selectively switching said power amplifier system from the oscillation generator and tuned output circuit of one channel to the oscillation generator and tuned output circuit of the other channel, an alternating current modulating circuit connected to the power amplifying system for amplitude modulating the waves transmitted by said transmitting system, a tone generator, a rectifier for waves generated by said tone generator, and means responsive to said rectified waves for keying said oscillation generators with a code signal, and means for selectively utilizing either the amplitude modulating means or the keying means for controlling the transmitted output of the transmitting system.

EDMUND A. LAPORT.